United States Patent
Sterbenz et al.

(10) Patent No.: US 11,248,716 B2
(45) Date of Patent: Feb. 15, 2022

(54) VALVE ASSEMBLY CONTROLLED BY ELECTROMAGNET

(71) Applicant: Ford Global Technologies, LLC, Dearborn, MI (US)

(72) Inventors: Scott Christopher Sterbenz, Brownstown, MI (US); Eric Jay MacLean, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 472 days.

(21) Appl. No.: 16/278,262

(22) Filed: Feb. 18, 2019

(65) Prior Publication Data

US 2020/0263801 A1 Aug. 20, 2020

(51) Int. Cl.
*F16K 31/06* (2006.01)
*B60H 1/24* (2006.01)

(52) U.S. Cl.
CPC ......... *F16K 31/0675* (2013.01); *B60H 1/248* (2013.01)

(58) Field of Classification Search
CPC ..... B60H 1/248; B60H 1/249; F16K 31/0675; F16K 31/105; F16K 31/0655; F16K 1/165; F16K 1/2021; F16K 31/06; F16K 17/06; B62D 37/02
See application file for complete search history.

(56) References Cited

U.S. PATENT DOCUMENTS

| 2,276,279 | A | * | 3/1942 | Asklund | F01P 7/10 180/68.1 |
|---|---|---|---|---|---|
| 3,392,654 | A | | 7/1968 | Grenier | |
| 7,784,576 | B2 | | 8/2010 | Guilfoyle et al. | |
| 8,025,045 | B2 | * | 9/2011 | Pettersson | B60K 11/085 123/568.12 |
| 8,118,124 | B2 | | 2/2012 | Shin et al. | |
| 8,708,787 | B2 | | 4/2014 | Alexander et al. | |
| 9,096,278 | B2 | | 8/2015 | Lee et al. | |
| 9,346,345 | B2 | | 5/2016 | Alexander et al. | |
| 9,410,717 | B2 | | 8/2016 | Marleau et al. | |
| 9,834,064 | B2 | | 12/2017 | Wissmueller et al. | |
| 10,173,493 | B2 | | 1/2019 | Iacovoni et al. | |
| 2010/0216384 | A1 | | 8/2010 | McCarthy et al. | |
| 2010/0243352 | A1 | | 9/2010 | Watanabe et al. | |
| 2013/0072101 | A1 | | 3/2013 | Marleau, Jr. et al. | |
| 2013/0267159 | A1 | | 10/2013 | McCarthy et al. | |
| 2013/0309956 | A1 | | 11/2013 | Mouch et al. | |
| 2014/0273784 | A1 | | 9/2014 | Wade et al. | |
| 2015/0072604 | A1 | | 3/2015 | Yoo | |

(Continued)

FOREIGN PATENT DOCUMENTS

| CN | 102729773 | 10/2012 |
|---|---|---|
| DE | 3016907 | 11/1981 |

(Continued)

*Primary Examiner* — Jessica Yuen
(74) *Attorney, Agent, or Firm* — David Coppiellie; Carlson, Gaskey & Olds, P.C.

(57) ABSTRACT

This disclosure relates to a valve assembly for a motor vehicle, such as a pressure relief valve (i.e., an "air extractor"), and a method of using the same. In an example, the valve assembly includes a flap moveable to between an open position and a closed position, a slider moveable along an axis and including an integrally formed arm in contact with the flap, and an electromagnet configured to be selectively activated to move the slider along the axis.

12 Claims, 7 Drawing Sheets

(56) References Cited

U.S. PATENT DOCUMENTS

| | | | |
|---|---|---|---|
| 2015/0165874 A1 | 6/2015 | Kawano et al. | |
| 2016/0229257 A1 | 8/2016 | Yerke et al. | |
| 2016/0363230 A1 | 12/2016 | Denkbaar et al. | |
| 2018/0086199 A1* | 3/2018 | Solazzo | B60K 11/085 |

FOREIGN PATENT DOCUMENTS

| | | |
|---|---|---|
| DE | 10231086 | 10/2003 |
| DE | 10330621 A1 | 2/2005 |
| DE | 102004046273 | 4/2006 |
| DE | 102012014569 A1 | 1/2014 |
| DE | 102014213999 A1 | 1/2015 |
| KR | 20110021021 A | 3/2011 |
| KR | 20120013062 | 2/2012 |

* cited by examiner

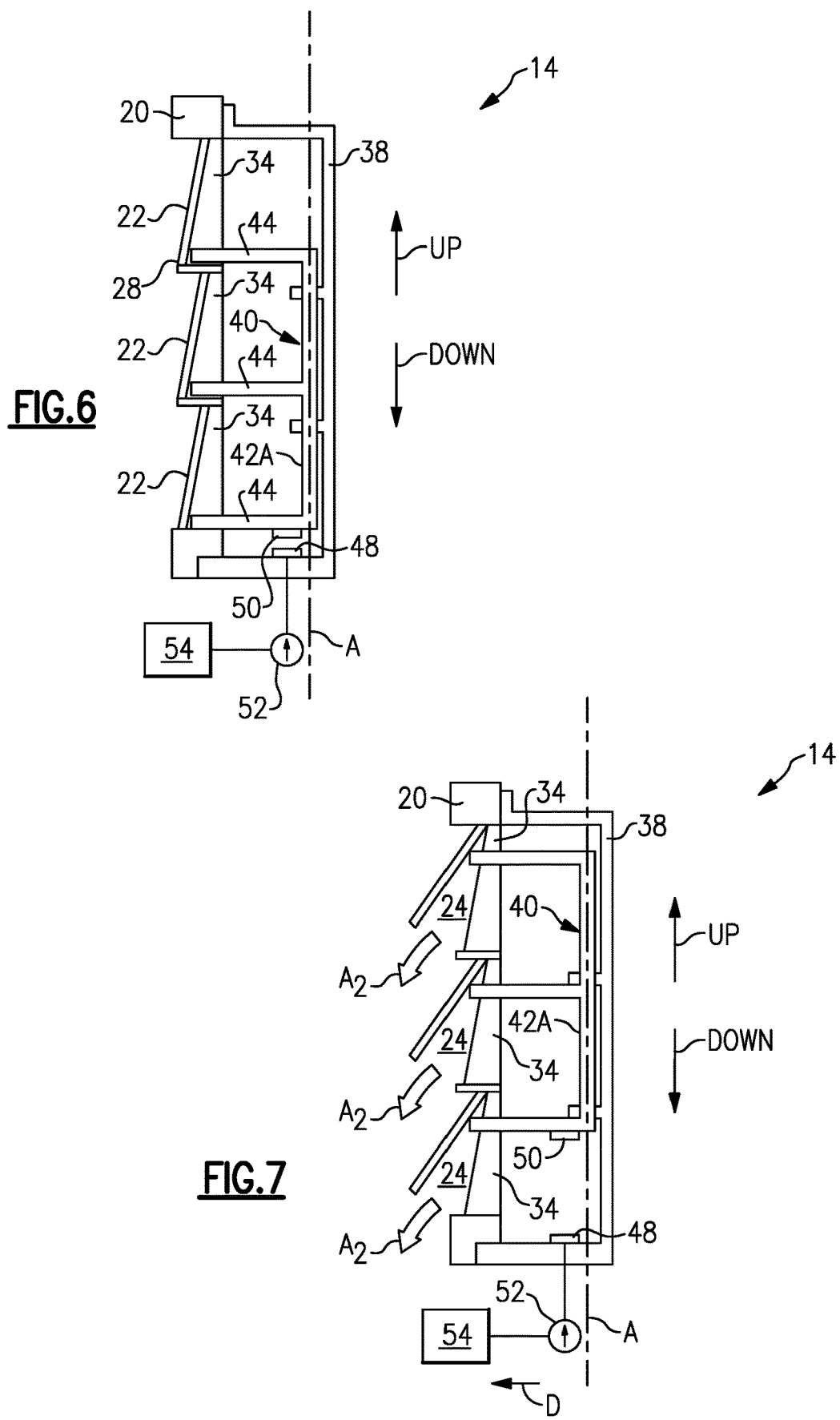

VALVE ASSEMBLY CONTROLLED BY ELECTROMAGNET

TECHNICAL FIELD

This disclosure relates to a valve assembly for a motor vehicle, such as a pressure relief valve (i.e., an "air extractor"), and a method of using the same. The valve assembly is controlled by an electromagnet.

BACKGROUND

Many vehicles include pressure relief valves, which are sometimes referred to as "air extractors," configured to mitigate pressure build-up in the vehicle. Pressure build-up may be caused when rapidly closing a door or when opening a window of the vehicle, as examples. In the former example, the pressure build-up created by the rapidly closing door can make it difficult to close the door or can prevent the door from being closed altogether. In latter example, the pressure build-up can cause a phenomenon known as "wind throb," which can cause passenger discomfort. With only one window open in the vehicle, air trying to enter through the open window generates a low frequency pressure pulsation, which is perceived as a "throbbing" sensation. Pressure relief valves are vents, typically in the rear of the vehicle, that provide an air flow path through the vehicle and mitigate pressure build-up.

SUMMARY

A valve assembly for a motor vehicle according to an exemplary aspect of the present disclosure includes, among other things, a flap moveable to between an open position and a closed position, a slider moveable along an axis and including an integrally formed arm in contact with the flap, and an electromagnet configured to be selectively activated to move the slider along the axis.

In a further non-limiting embodiment of the foregoing valve assembly, the assembly includes a current source in electronic communication with the electromagnet, and a controller in electronic communication with the current source. The current source is configured to deliver current to the electromagnet in response to an instruction from the controller.

In a further non-limiting embodiment of any of the foregoing valve assemblies, the assembly includes a guide, and the slider is configured to move relative to the guide.

In a further non-limiting embodiment of any of the foregoing valve assemblies, the guide is attached to a frame supporting the flap.

In a further non-limiting embodiment of any of the foregoing valve assemblies, the electromagnet is mounted to the guide, and the slider includes a target configured to be repelled by a magnetic field generated by the electromagnet.

In a further non-limiting embodiment of any of the foregoing valve assemblies, when the electromagnet is activated, the electromagnet repels the target such that the slider moves along the axis in a first direction thereby causing the flap to move to a partially open or a fully open position.

In a further non-limiting embodiment of any of the foregoing valve assemblies, the flap includes a hinged end and a free end, and movement of the slider in the first direction results in movement of the arm toward the hinged end of the flap.

In a further non-limiting embodiment of any of the foregoing valve assemblies, when the electromagnet is deactivated, the slider moves along the axis in a second direction opposite the first direction and the flap moves to a fully closed position.

In a further non-limiting embodiment of any of the foregoing valve assemblies, the arm projects from a main body of the slider in a direction substantially normal to the axis.

In a further non-limiting embodiment of any of the foregoing valve assemblies, the arm directly contacts the flap.

In a further non-limiting embodiment of any of the foregoing valve assemblies, the arm directly contacts the flap between sides of the flap.

In a further non-limiting embodiment of any of the foregoing valve assemblies, the flap includes a channel, and the arm is received in the channel.

In a further non-limiting embodiment of any of the foregoing valve assemblies, the flap is one of a plurality of flaps, the arm is one of a plurality of arms, and each of the arms contacts a respective one of the flaps.

In a further non-limiting embodiment of any of the foregoing valve assemblies, the valve assembly is a pressure relief valve.

A method according to an exemplary aspect of the present disclosure includes, among other things, opening a flap of a valve assembly by activating an electromagnet and thereby moving a slider in a first direction along an axis. Further, the slider includes an integrally formed arm in contact with the flap.

In a further non-limiting embodiment of the foregoing method, the slider includes a target, and the step of opening the flap includes activating the electromagnet such that the electromagnet repels the target.

In a further non-limiting embodiment of any of the foregoing methods, the method includes closing the flap by deactivating the electromagnet and thereby permitting movement of the slider in a second direction opposite the first direction.

In a further non-limiting embodiment of any of the foregoing methods, the step of opening the flap includes moving the flap to one of a partially open position and a fully open position.

In a further non-limiting embodiment of any of the foregoing methods, the arm projects from a main body of the slider in a direction substantially normal to the axis.

BRIEF DESCRIPTION OF THE DRAWINGS

FIG. 6 is a cross-sectional view of the example valve assembly with the flaps in a fully closed position.

FIG. 7 is a cross-sectional view of the example valve assembly with the flaps in an open position.

DETAILED DESCRIPTION

This disclosure relates to a valve assembly for a motor vehicle, such as a pressure relief valve (i.e., an "air extractor"), and a method of using the same. In an example, the valve assembly includes a flap moveable to between an open position and a closed position, a slider moveable along an axis and including an integrally formed arm in contact with the flap, and an electromagnet configured to be selectively activated to move the slider along the axis. Among other benefits, the valve assembly efficiently transfers force to the flaps while requiring fewer moving parts than prior designs, which increases reliability and reduces cost and assembly time. These and other benefits will be appreciated from the following description.

Figure 1:
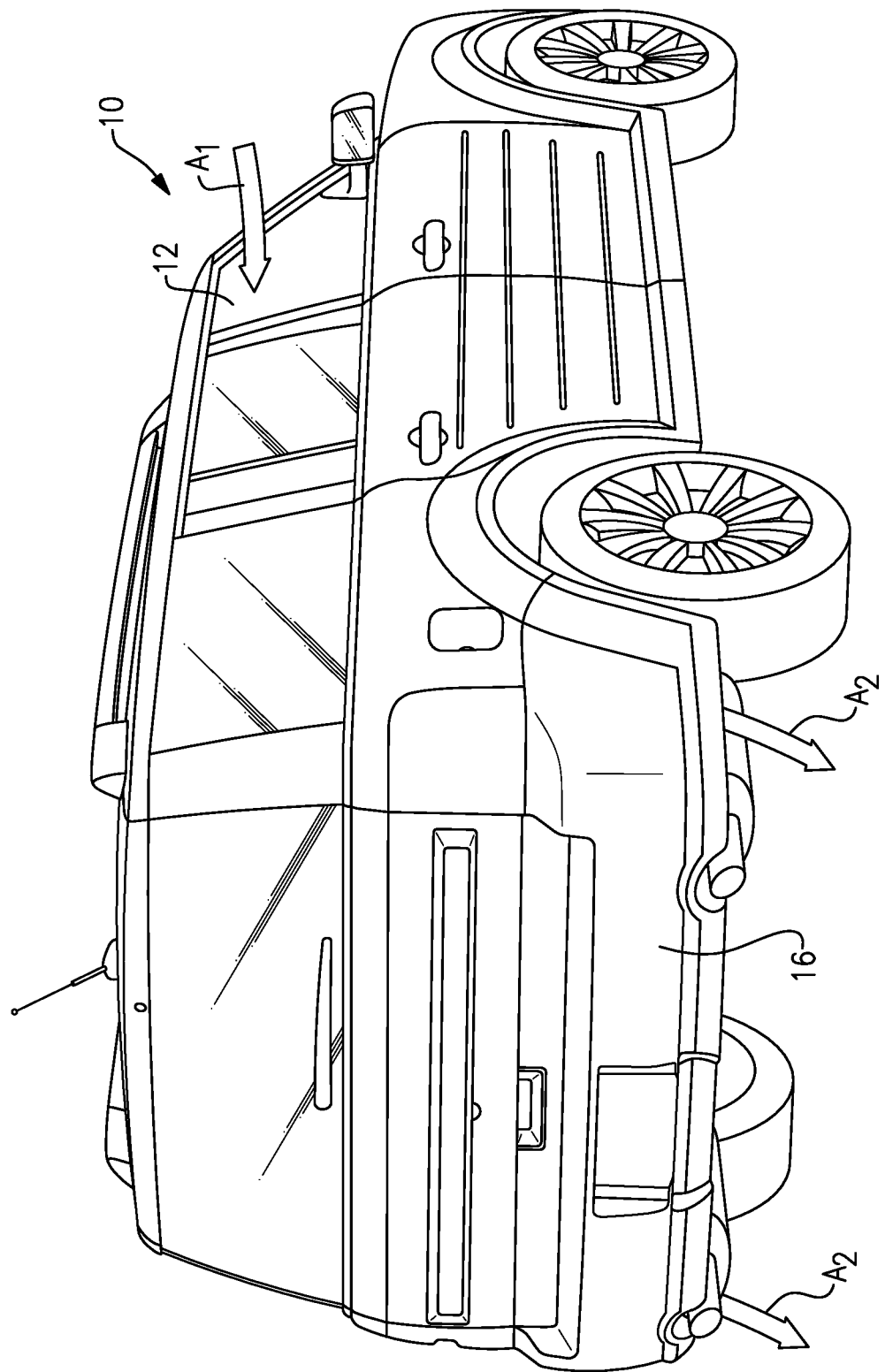
FIG. 1 is a rear-perspective view of a motor vehicle with an example valve assembly.

FIG. 1 illustrates a motor vehicle 10, which in this example is an SUV. In FIG. 1, a front passenger-side window 12 is open, allowing air $A_1$ to enter the vehicle. In this example, there are no other windows open. The vehicle 10 includes at least one valve assembly configured to allow air $A_2$ to exit the passenger cabin of the vehicle 10 and flow to the outside environment.

In this example, the valve assembly is a pressure relief valve, and the vehicle 10 includes two pressure relief valves 14 (FIG. 2) covered by the rear bumper fascia 16 of the vehicle 10. It should be understood that the vehicle 10 could include one or more pressure relief valves 14. While the pressure relief valves 14 are covered by rear bumper fascia 16 in this example, the pressure relief valves 14 could be in other locations, such as adjacent a rear license plate mount or the tail lamps of the vehicle 10.

The pressure relief valves 14 are configured to allow air $A_2$ to exit the passenger cabin of the vehicle 10, which mitigates or eliminates the effects of pressure build-up within the vehicle 10. For example, without the pressure relief valves 14, the air $A_1$ could create a "wind throb" effect that causes passenger discomfort. Another example of pressure build-up is when a passenger suddenly shuts a vehicle door. Without the pressure relief valves 14, if the door were closed too quickly, it may be unable to be closed at all due to pressure build-up.

Figure 2:
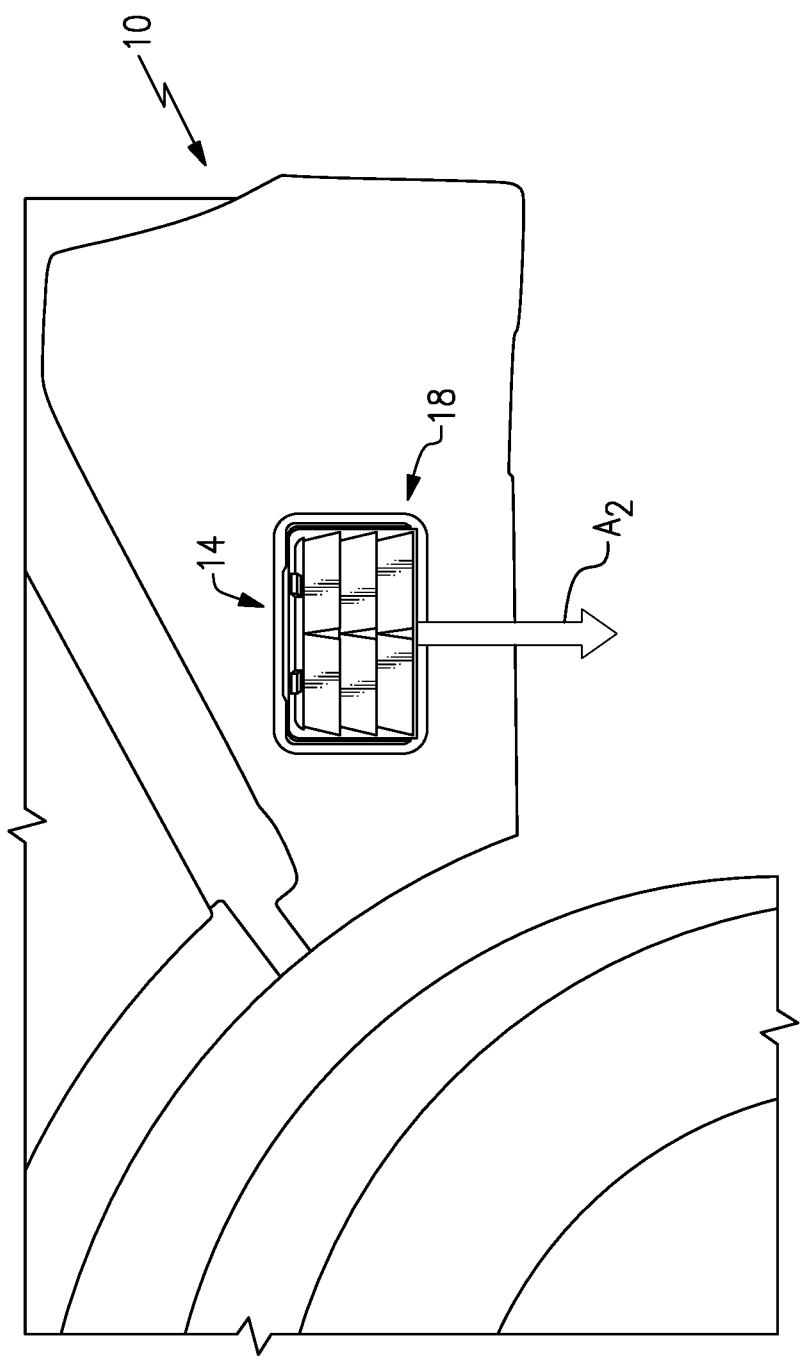
FIG. 2 is a close-up view of the example valve assembly.

FIG. 2 illustrates an example pressure relief valve 14 positioned in a cavity 18, which is ordinarily covered by the rear bumper fascia 16. In FIG. 2, the rear bumper fascia 16 is removed from the vehicle 10 for ease of illustrating the pressure relief valve 14.

Figure 3:
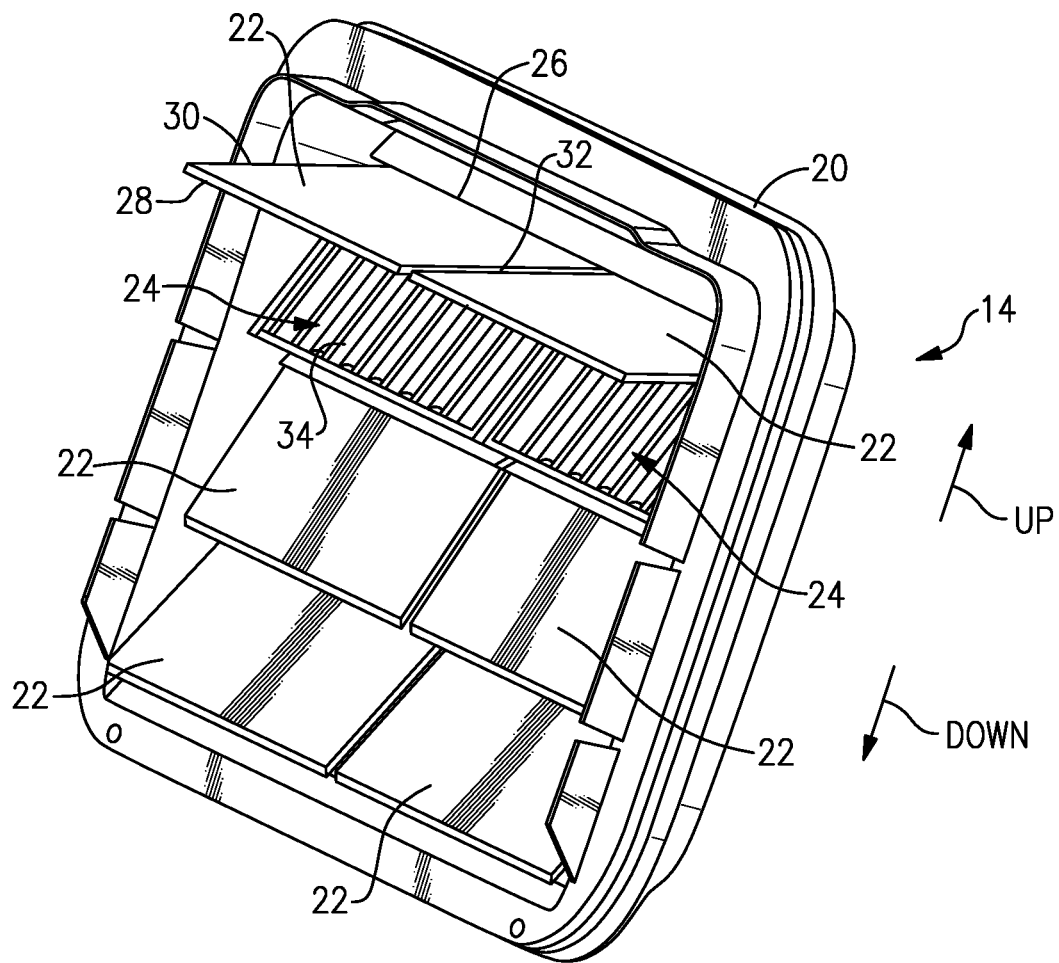
FIG. 3 illustrates the example valve assembly from a front perspective with two flaps in an open position.

FIG. 3 illustrates an example pressure relief valve 14 in more detail. In this example, the pressure relief valve 14 includes a frame 20 supporting six flaps 22 arranged in three rows of two flaps each. Each of the flaps 22 is moveable between a fully open position and a fully closed position (and, as will be explained below, a number of positions in between). The flaps 22 in the top row of FIG. 3 are in the fully open position, while the flaps 22 in the bottom two rows are in a fully closed position.

While a particular flap arrangement is shown in FIG. 3, this disclosure extends to pressure relief valves 14 with other flap arrangements, including such valves with one or more flaps. Further, as will be appreciated from the below, the flaps 22 are ordinarily moveable in unison, such that they are all in the same operative position at the same time. In FIG. 3, some of the flaps 22 are open and some are closed solely for purposes of illustrating the functionality of the flaps 22.

In this example, the flaps 22 are rectangular, and are configured to selectively cover respective rectangular openings 24 formed in the frame 20. Each flap 22 includes a hinged end 26 about which the remainder of the flap 22 pivots relative to the frame 20. The hinged end 26 is at a top of the flaps 22, in this example. The term "top" is used to refer to the upper edge of the flap 22. The "up" and "down" directions are labeled in FIG. 3 for reference. Opposite the hinged end 26, the flap 22 includes a free end 28 between first and second lateral sides 30, 32. The free end 28 is downward of the hinged end 26. The flap 22 may be made of a polyurethane or polymer material, as examples. This disclosure is not limited to any particular material type of the flap 22.

When the flaps 22 are open, they expose openings 24 formed in the frame 20 and permit air to flow from the cabin of the vehicle 10 to the outside environment. In this example, a plurality of vanes 34 are provided in the openings 24 for directing air flow. When in the closed position, the flaps 22 are configured to seal against the frame 20, substantially blocking air flow. As will be appreciated from the below, the flaps 22 are not merely moveable between fully open and fully closed positions, as shown in FIG. 3, but instead are moveable to a number of partially open positions. In this sense, the flaps 22 may be considered infinitely adjustable. This aspect of the disclosure allows for precise flow regulation.

Figure 4:
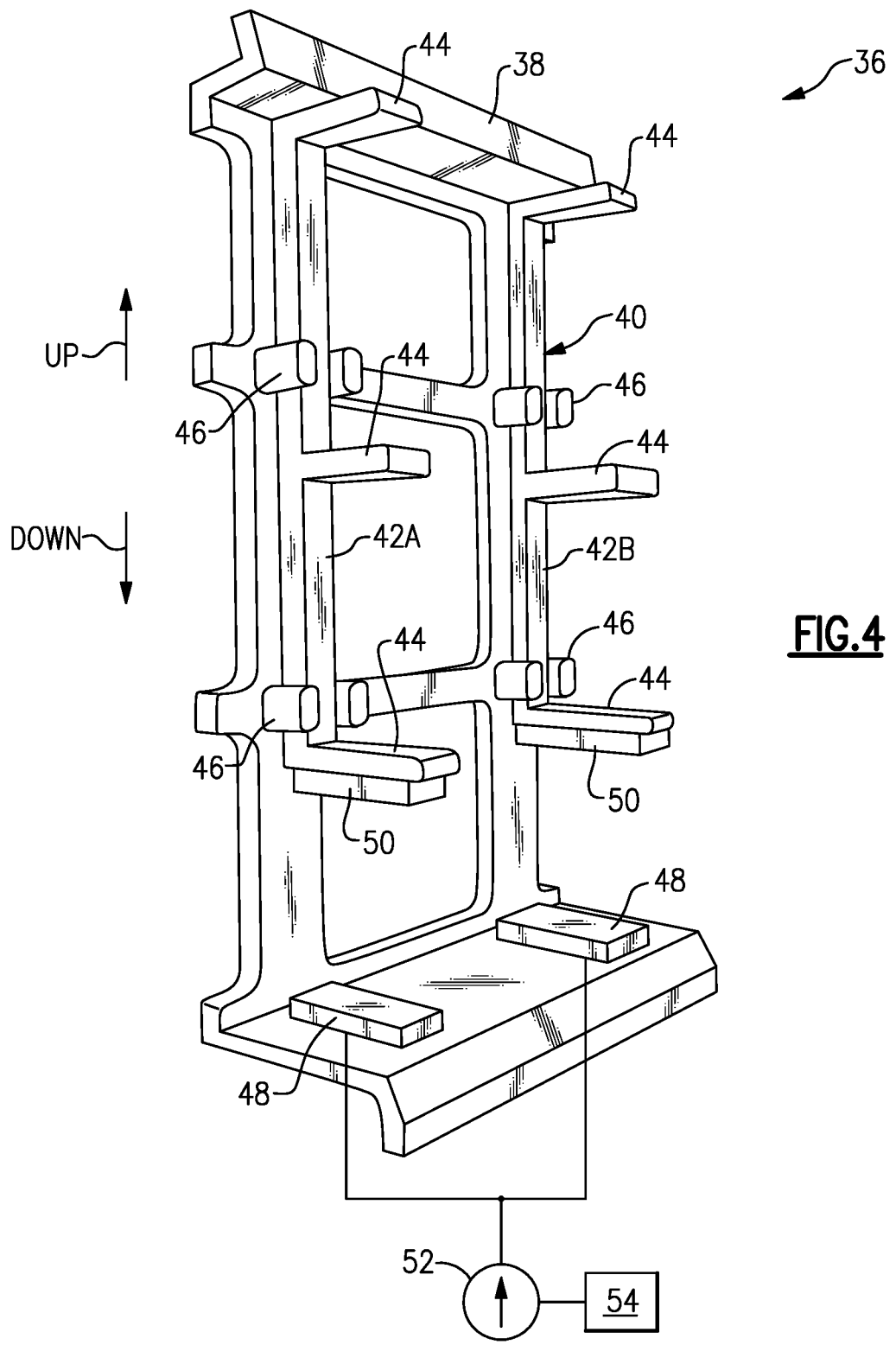
FIG. 4 is a perspective view of an example actuator.

FIG. 4 illustrates, somewhat schematically, an example actuator 36 configured to selectively open and close the flaps 22. The actuator 36 includes a guide 38 and a slider 40. The slider 40 includes a main body having first and second sections 42A, 42B extending in a direction parallel to the "up" and "down" directions, which are labeled again in FIG. 4. The first and second sections 42A, 42B each include three arms 44 integrally formed with the respective one of the first and second sections 42A, 42B. In one example, the first and second sections 42A, 42B are injection molded with the arms 44 in a single manufacturing step. The first and second sections 42A, 42B may be formed separate from one another, or may be integrally formed together as one piece.

The slider 40 is moveable in the "up" and "down" directions along an axis A (FIGS. 6 and 7) relative to the guide 38. The guide 38 is configured to guide movement of the slider 40 in the "up" and "down" directions along the axis A. The guide 38, in this example, includes tabs 46 configured to constrain movement of the slider 40.

The arms 44 project from a respective one of the main body sections 42A, 42B in a direction substantially normal to the "up" and "down" directions, and normal to the axis A, to a free end. As will be discussed below, the actuator 36 is arranged relative to the frame 20 such that the free ends of the arms 44 are configured to contact a respective one of the flaps 22. In particular, the free ends of the arms 44 are configured to directly contact a respective one of the flaps 22 at a location between the sides 30, 32.

Providing the slider 40 with integrally-formed arms 44 which project substantially normally to the "up" and "down" directions results in the actuator 36 efficiently transferring force from the slider 40 to the flaps 22. In particular, the arms 44 directly transmit force to the flaps 22, rather than by attempting to rotate or twist the flaps 22 by imparting a rotational force on a side of the flaps 22. The arrangement of the slider 40 also reduces the number of moving parts relative to prior disclosures, making the actuator 36 easier to manufacture and less likely to bind during operation.

The actuator 36 further includes at least one electromagnet 48 mounted to the guide 38, and at least one target 50 mounted to the slider 40. The electromagnet 48 is configured to generate a magnetic field to selectively attract or repel the target 50. Thus, the electromagnet 48 is configured to be selectively activated to move the slider 40 in the "up" and "down" directions along an axis A. In one particular example, the electromagnet 48 is configured to repel the target 50. Thus, when the electromagnet 48 is activated, the slider 40 moves in the "up" direction.

In the example of FIG. 4, there are two electromagnets 48, one below each of the first and second sections 42A, 42B of the slider 40. Further, the first and second sections 42A, 42B of the slider 40 each include a respective target 50 arranged vertically above a respective one of the electromagnets 48.

The targets 50 may be provided by permanent magnets which retain their magnetic properties even in the absence of an inducing field of current. In one particular example, the targets 50 may be provided by rare-earth permanent magnets, in one example. Alternatively the targets 50 may be provided by other pieces of metallic material. On the other hand, the electromagnets 48 are provided by magnets in which a magnetic field is produced by an electric current. In this disclosure, electromagnets 48 are in electronic communication with a current source 52, which is shown schematically in FIG. 4. The current source 52 may be a battery or an electronic circuit responsive to instructions from a controller 54 to deliver electric current to the electromagnets 48. The controller 54 is also shown schematically in FIG. 4.

The controller 54 is in electronic communication with various components of the vehicle 10, and in particular the current source 52. The controller 54 is configured to receive information, interpret that information, and issue commands to various components of the vehicle 10 based on that information. It should be understood that the controller 54 may include hardware and software, and could be part of an overall vehicle control module, such as a vehicle system controller (VSC), or could alternatively be a stand-alone controller separate from the VSC. Further, the controller 54 may be programmed with executable instructions for interfacing with and operating the various components of the vehicle 10. The controller 54 additionally includes a processing unit and non-transitory memory for executing the various control strategies and modes of the vehicle system. Although it is shown as a single device, the controller 54 may include multiple controllers in the form of multiple hardware devices, or multiple software controllers within one or more hardware devices.

Figure 5:
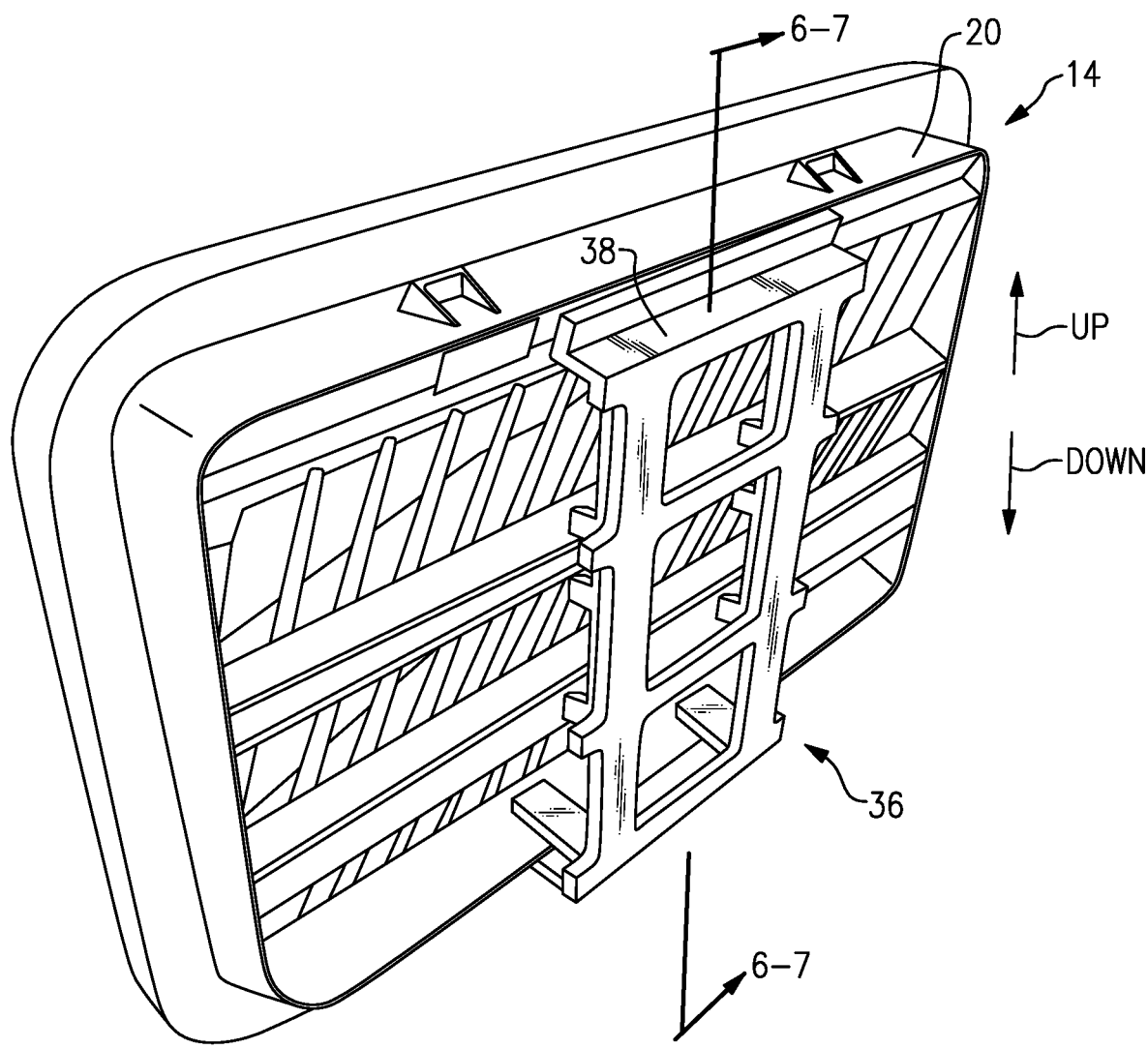
FIG. 5 illustrates the example valve assembly from a rear perspective.

As shown in FIG. 5, the actuator 36 is attached to a side of the frame 20 opposite the flaps 22. In particular, the guide 38 may be fastened to the frame 20 using fasteners such as screws.

FIGS. 6 and 7 are cross-sectional views of the pressure relief valve 14, and specifically illustrate the arrangement of the slider 40 relative to the flaps 22. In FIG. 6, the flaps 22 are in a fully closed position, and FIG. 7 is representative of the flaps 22 in an open position, such as a fully open position.

In the fully closed position of FIG. 6, air is prevented from exiting the passenger cabin of the vehicle 10 via the pressure relief valve 14. In particular, in FIG. 6, the flaps 22 are arranged such that their free ends 28 contact a respective portion of the frame 20 so as to seal the openings 24. The flaps 22 are biased to the fully closed position by virtue of their arrangement relative to the frame 20, the force of gravity, and the resilient nature of the material forming the flaps 22.

In FIG. 6, the electromagnet 48 is not activated, meaning no current is flowing through the electromagnet 48. As such, the slider 40 is near a bottom of the guide 38. In particular, when the electromagnet 48 is not activated, the slider 40 naturally moves along the axis A in the "down" direction under the force of gravity and/or the bias of the flaps 22 to the fully closed position until the slider 40 comes to rest near the bottom of the guide 38. In this position, the arms 44 are arranged adjacent the free end 28 of the flaps 22. In particular, the arms 44 do not inhibit the ability of the flaps 22 from fully closing.

In FIG. 7, the electromagnet 48 is activated. In particular, in response to a command from the controller 54, the current source 52 causes current to flow through the electromagnet 48 such that the electromagnet 48 generates a magnetic field which repels the target 50, thereby causing the slider 40 to move in the "up" direction along the axis A. In particular, the repulsive force from the electromagnet 48 overcomes the bias of the flaps 22 toward the fully closed portion. As such, the arms 44 move upward along a respective one of the flaps 22 in a direction closer to the hinged ends 26 relative to FIG. 6. The flaps 22 are inclined relative to the axis A such that the hinged ends 26 are closer to the axis A than the free ends 28. In FIG. 7, the arms 22 project in a direction D, which is normal to the axis A, beyond the hinged ends 26. In other words, the free ends of the arms 44 are extend further from the axis A than the hinged ends 26.

Thus, movement of the slider 40 in the "up" direction causes the arms 44 to lift, and further causes the arms 44 to impart an upward force on the flaps 22, thereby rotating the flaps 22 outwardly, away from the axis A, about the hinged ends 26. Such rotation of the flaps 22 exposes the respective openings 24 and permits air $A_2$ to flow out of the passenger cabin of the vehicle 10.

As mentioned above, the slider 40 efficiently transfers force to the flaps 22. As such, the repulsive force required to open the flaps 22 is relatively low. In this way, this disclosure is more efficient and saves energy as compared to prior designs.

To return the flaps 22 to the closed position, the electromagnet 48 is deactivated. In particular, the controller 54 commands the current source 52 to cease delivering current to the electromagnet 48. The slider 40, thus, slides in the "down" direction back to the position of FIG. 6 under the force of gravity and/or the bias of the flaps 22 back to the fully closed position.

The controller 54 may be programmed to command the flaps 22 to open under a number of conditions. In one example, the controller 54 commands the flaps 22 to open when a door of the vehicle 10 unlocks and opens. In this way, the flaps 22 are already open when the door begins to close. In another example, the controller 54 commands the flaps to open when a climate control system of the vehicle 10 increases a fan speed. Again, these are merely two examples. The controller 54 may be programmed to command the flaps 22 to open under other conditions.

In addition to moving the flaps 22 from a fully closed position to a fully open position, it may be desirable to partially open the flaps 22. In this way, the controller 54 may instruct the current source 52 to deliver an intermediate level of current to the electromagnet 48, which is less than the level of current required to move the flaps 22 to the fully open position. The flaps 22 are moveable to any number of partially open positions. In this sense, the flaps 22 are infinitely adjustable.

Figure 8:
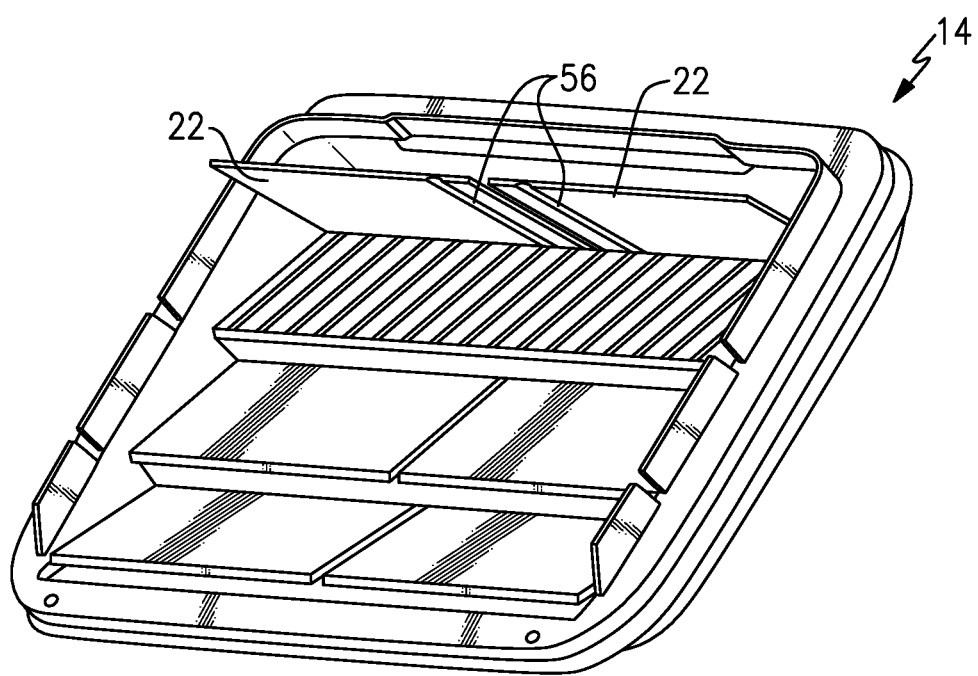
FIG. 8 illustrates an aspect of example valve assembly in which the flaps include channels configured to receive arms of a slider.

In order to facilitate movement of the arms 44 along the flaps 22, the flaps 22 may include channels formed therein. Example channels 56 are shown in FIG. 8. The channels 56 are formed in a side of the flaps 22 facing the actuator 36 and at a location between the sides 30, 32. The channels 56 are essentially grooves formed in the flaps 22, which are sized to correspond to the size and shape of the free ends of the arms 44.

While FIGS. 6 and 7 only illustrates a portion of the slider 40, in particular the main body section 42A, relative to three of the flaps 22, it should be understood that the remaining portions of the actuator 36 would be arranged similar to what is shown and described in FIGS. 6 and 7. In particular, the electromagnet 48 associated with the main body section 42B would be controlled in the same way as the electromagnet shown in FIGS. 6 and 7. In one example, there is only one electromagnet 48 configured to selectively repel both targets 50. In yet another example, the two electromagnets 48 may be controlled independently, such that the main body sections 42A, 42B are independently moveable such that the two columns of flaps 22 are capable of opening and closing independent of one another.

While the actuator 36 has been shown and described relative to a pressure relief valve, the actuator 36 may be used in other contexts. As one other example, the actuator 36 may be used to selectively open and close grille shutters.

It should be understood that terms such as "about," "substantially," and "generally" are not intended to be boundaryless terms, and should be interpreted consistent with the way one skilled in the art would interpret those terms. Further, directional terms such as "top," "bottom," "up," and "down" are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A valve assembly for a motor vehicle, comprising:
    a flap moveable to between an open position and a closed position;
    a slider moveable along an axis and including an integrally formed arm in contact with the flap;
    an electromagnet configured to be selectively activated to move the slider along the axis; and
    a guide, wherein the slider configured to move relative to the guide,
    wherein the electromagnet is mounted to the guide, and
    wherein the slider includes a target configured to be repelled by a magnetic field generated by the electromagnet.

2. The valve assembly as recited in claim 1, further comprising:
    a current source in electronic communication with the electromagnet; and
    a controller in electronic communication with the current source, the current source configured to deliver current to the electromagnet in response to an instruction from the controller.

3. The valve assembly as recited in claim 1, wherein the guide is attached to a frame supporting the flap.

4. The valve assembly as recited in claim 1, wherein, when the electromagnet is activated, the electromagnet repels the target such that the slider moves along the axis in a first direction thereby causing the flap to move to a partially open or a fully open position.

5. The valve assembly as recited in claim 4, wherein the flap includes a hinged end and a free end, and wherein movement of the slider in the first direction results in movement of the arm toward the hinged end of the flap.

6. The valve assembly as recited in claim 4, wherein, when the electromagnet is deactivated, the slider moves along the axis in a second direction opposite the first direction and the flap moves to a fully closed position.

7. The valve assembly as recited in claim 1, wherein the arm projects from a main body of the slider in a direction substantially normal to the axis.

8. The valve assembly as recited in claim 1, wherein the arm directly contacts the flap.

9. The valve assembly as recited in claim 8, wherein the arm directly contacts the flap between sides of the flap.

10. The valve assembly as recited in claim 8, wherein:
    the flap includes a channel, and
    the arm is received in the channel.

11. The valve assembly as recited in claim 1, wherein:
    the flap is one of a plurality of flaps,
    the arm is one of a plurality of arms, and
    each of the arms contacts a respective one of the flaps.

12. The valve assembly as recited in claim 1, wherein the valve assembly is a pressure relief valve.

* * * * *